June 30, 1953 L. J. LOVISEK 2,643,401
APPARATUS FOR MAKING SCREW FASTENERS
Filed Nov. 3, 1950 7 Sheets-Sheet 3

INVENTOR.
L. J. Lovisek
BY Robert Cobb
Attorneys.

June 30, 1953 L. J. LOVISEK 2,643,401
APPARATUS FOR MAKING SCREW FASTENERS
Filed Nov. 3, 1950 7 Sheets-Sheet 4

INVENTOR.
L. J. Lovisek
BY
Cobb Cobb
Attorneys

June 30, 1953  L. J. LOVISEK  2,643,401
APPARATUS FOR MAKING SCREW FASTENERS
Filed Nov. 3, 1950  7 Sheets-Sheet 5

INVENTOR.
L. J. Lovisek
BY Robb + Robb
Attorneys

June 30, 1953 L. J. LOVISEK 2,643,401
APPARATUS FOR MAKING SCREW FASTENERS
Filed Nov. 3, 1950 7 Sheets-Sheet 6

INVENTOR.
L. J. Lovisek
BY Robb & Robb
Attorneys.

June 30, 1953　　　L. J. LOVISEK　　　2,643,401
APPARATUS FOR MAKING SCREW FASTENERS
Filed Nov. 3, 1950　　　　　　　　　　　7 Sheets-Sheet 7
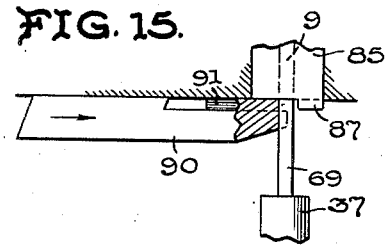
FIG. 15.
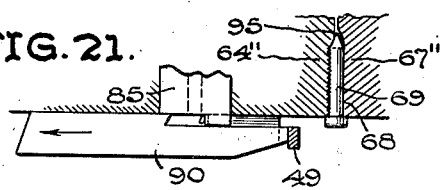
FIG. 21.
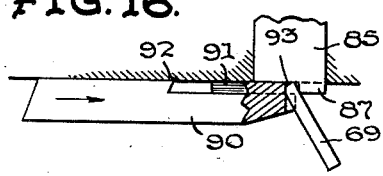
FIG. 16.
FIG. 23.
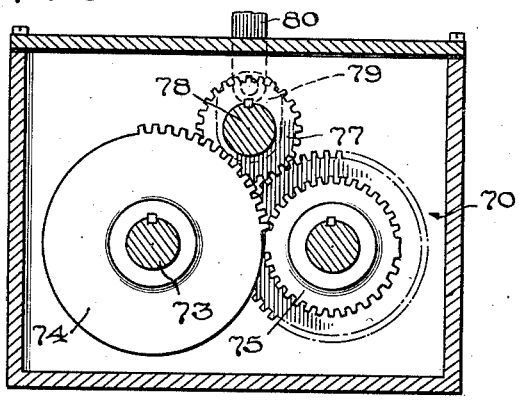
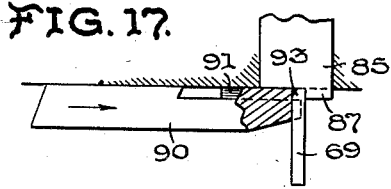
FIG. 17.
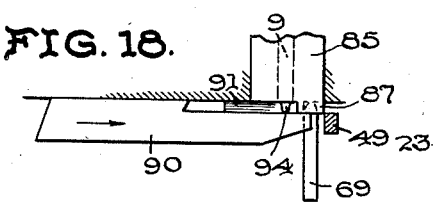
FIG. 18.
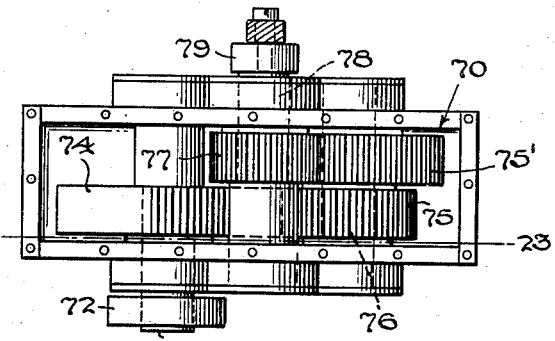
FIG. 22.
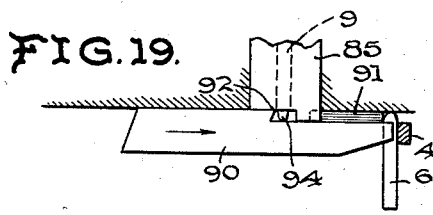
FIG. 19.
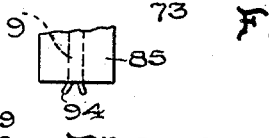
FIG. 18a.
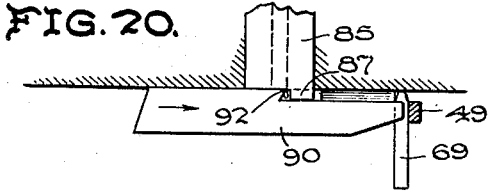
FIG. 20.
INVENTOR.
L. J. Lovisek
BY Robert Coles
Attorneys.

Patented June 30, 1953

2,643,401

UNITED STATES PATENT OFFICE 2,643,401

APPARATUS FOR MAKING SCREW FASTENERS

Louis J. Lovisek, New York, N. Y., assignor to Parker-Kalon Corporation, New York, N. Y., a corporation of New York Application November 3, 1950, Serial No. 193,965

10 Claims. (Cl. 10—2)

The present invention relates to apparatus for making screw fasteners, and more particularly to apparatus for forming screw fasteners from a continuous length of wire stock of a diameter suitable for making screws of a desired size.

Heretofore, a number of separate machines have been required for forming screws from wire stock, namely, one machine for cutting the wire into blanks of the desired length and forming a head on the blanks, another machine for forming a slot or recess in the screw head, and still another machine for forming the threads on the shank of the headed screw blank. Separate skilled operators are usually required for each separate machine or operation. Moreover, it was necessary to transfer the screw blanks from one machine to the other between each of the above operations, thereby requiring considerable time and labor in handling the partially completed screw blanks, and adding to the cost of manufacture.

It is accordingly a primary object of this invention to provide apparatus for performing the steps of at least two of the above mentioned machines on a single machine, thereby effecting a saving of a substantial portion of the operating expenses, such as the upkeep for separate machines, and wages for machine operators, and at the same time, increasing the potential output of finished screw fasteners.

The apparatus for producing screw fasteners according to this invention performs the steps of feeding a continuous length of wire stock of a diameter suitable for producing the desired screw size to a cut-off station, cutting off successive predetermined lengths of the wire stock at said first station to form screw blanks, successively and automatically transferring the cut-off blanks to a combined heading and threading station where the heads are formed on the blanks and then the thread is immediately thereafter formed on the shank of the headed blanks without further transfer, and all operations performed by a single machine.

Another object of the invention is to provide an improved apparatus for making screw fasteners, characterized by heading screw blanks while the blanks are supported by thread-rolling dies, so that the resulting headed blanks will be instantly in perfect position for performance of the threading operation by the thread-rolling dies.

Other and further objects and advantages of the invention will be hereinafter set forth, and the novel features thereof defined by the appended claims.

In the accompanying drawings:

Figure 15 is an enlarged fragmentary view, with certain of the parts broken away and shown in section, showing the modified quill and cut-off knife of Figures 12 and 13, respectively, in their cooperative positions at the commencement of a cut-off operation;

Figure 16 is a view similar to Figure 15, showing the wire stock as it is initially bent upon further movement of the cut-off knife toward the quill, preliminary to complete severance of the stock;

Figure 17 is a view similar to Figure 16, showing the wire stock as it returns to a straightened position upon further movement of the cut-off knife towards the quill, but still without complete severance of the stock;

Figure 18 is a view similar to Figure 17, showing the screw blank completely severed from the wire stock upon further movement of the cut-off knife towards the quill;

Figure 18a is a fragmentary view in side elevation, showing the waste projections remaining on the end of the wire stock after the screw blank has been completely severed, as in Figure 18;

Figure 19 is a view similar to Figure 18, showing the severed screw blank as it is engaged by the transfer finger upon further movement of the cut-off knife towards the quill and with the knife in the act of severing the jagged ends of the wire stock shown in Figure 18a;

Figure 20 is a view similar to Figure 19, showing the severed waste projections of the wire, being pressed partly into the V-groove of the quill as the knife reaches the end of its blank severing stroke;

Figure 21 is a view similar to Figure 20, showing the cut-off blade on its return stroke ejecting the compressed waste particles from the quill, and further showing the pointed screw blank after it has been transferred to the heading and thread rolling station in the thread rolling dies, with the blank partly headed and ready for completing the head and for rolling threads on the shank;

Figure 22 is a top plan of the intermittent transmission mechanism that operates the thread rolling dies, the cover plate for the transmission housing being removed; and Figure 23 is a view in vertical section taken on the plane of the line 23—23 of Figure 22.

Like reference characters designate corresponding parts in the several figures of the drawings.

In explaining my invention herein, I have illustrated its application to a conventional header apparatus, known commercially as a solid die, double stroke toggle header, and therefore, only those general features of this apparatus have been shown which will assist in a ready understanding of the present invention. Reference may be had to prior Patents 1,478,356, 2,160,087 and 2,261,067 for further details or information relative to the header structure, but it is to be understood that the invention is not limited to headers of this type, since it will be obvious that it can be applied to so-called crank headers or eccentric-operated headers, as well as to multiple station headers commercially known as "Progressive" headers or "Duplex" headers. Moreover, the number of blows employed in the heading operations is not material and my invention is not limited to headers of the two-blow type.

Figure 1:
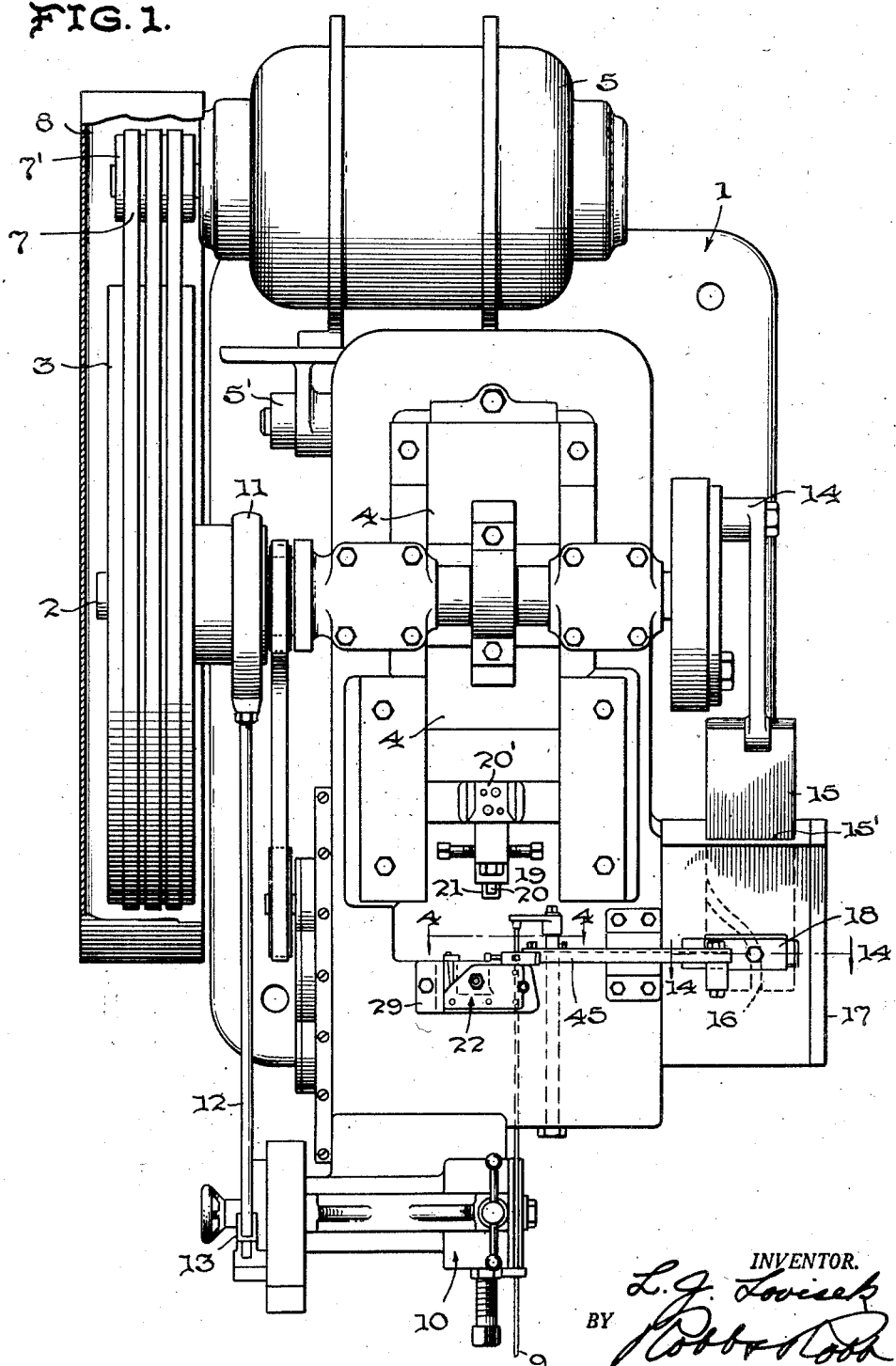
Figure 1 is a top plan of a conventional solid die, double stroke toggle header as modified to incorporate my invention therein, with a portion of the cover for the drive belts broken away.
Figure 2:
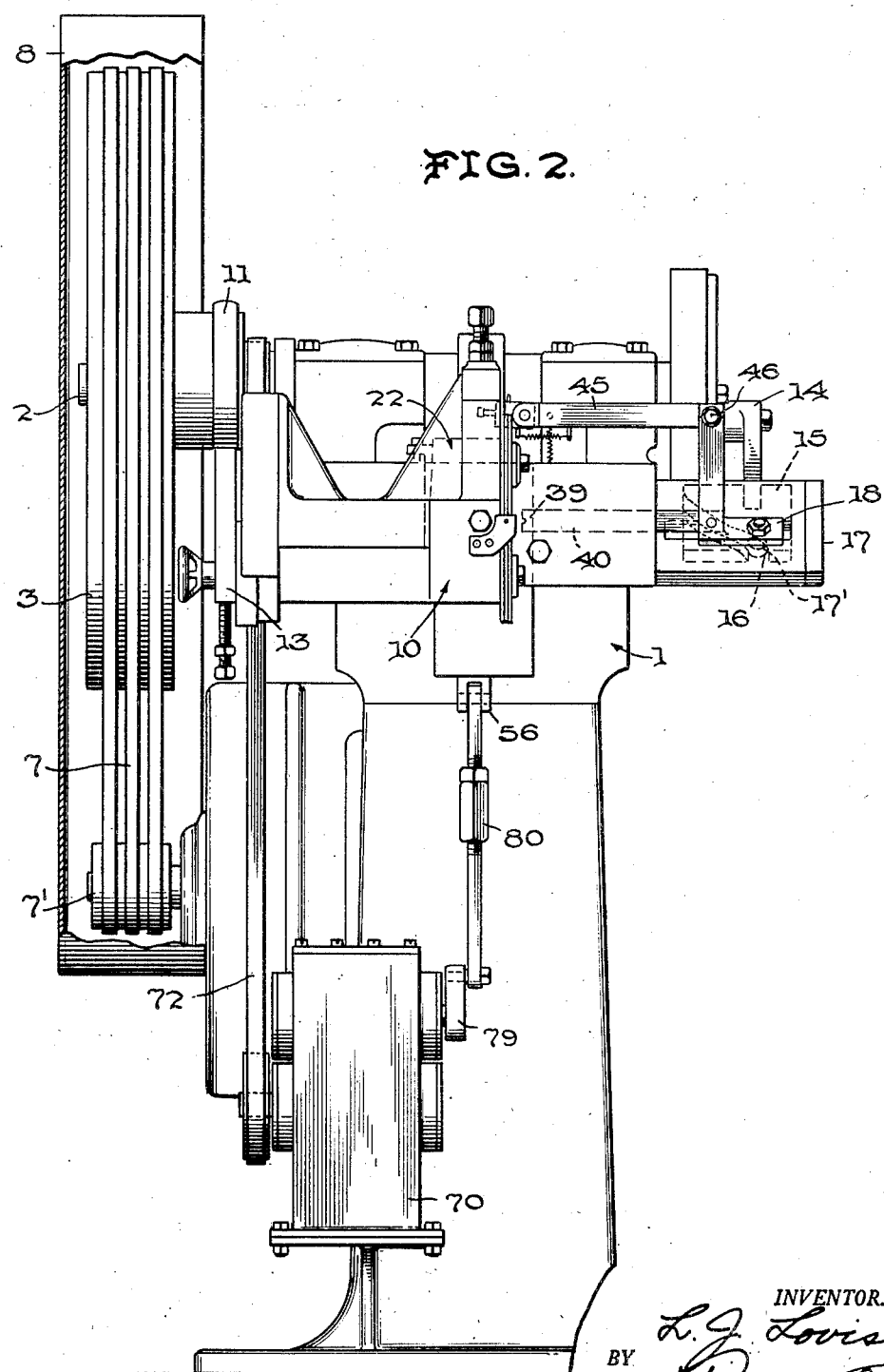
Figure 2 is a front elevation of the apparatus of Fig. 1, a portion of the cover for the drive belts being broken away in this view also.
Figure 3:
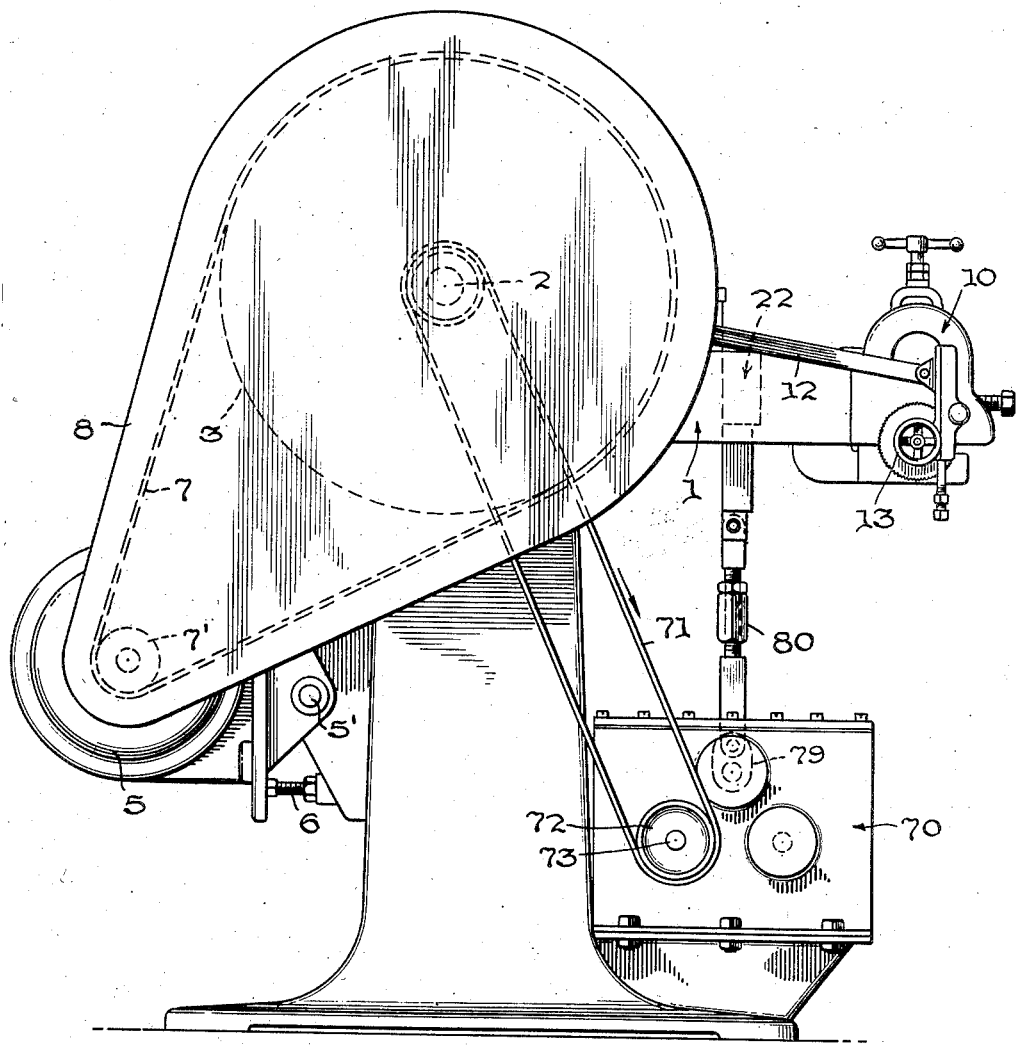
Figure 3 is a side elevation of the apparatus as observed from the driving side.

Referring to Figures 1, 2 and 3 of the drawings, 1 designates the frame of the machine on which is mounted a crankshaft 2 carrying the flywheel 3. The toggle mechanism for actuating the heading dies is denoted generally at 4. The motor 5 for driving the machine is pivotally mounted as at 5', and is adjustably positioned by means of the adjusting screw and its associated parts generally denoted at 6. Driving connection between the flywheel 3 and the motor 5 is made by conventional means such as the V-belts 7 and pulley denoted at 7', the flywheel, V-belts and motor pulley being enclosed in a cover or guard 8.

Wire stock 9, generally supported on a reel (not shown) at the front of the machine, is intermittently fed to the apparatus by means of the intermittent feed mechanism generally denoted at 10, the feed mechanism being operated by an eccentric 11, mounted on the crankshaft 2, through the rod 12 and the ratchet and pawl mechanism 13, as will be understood by those skilled in the art of conventional header machines.

The end of the crankshaft 2 opposite the flywheel 3 carries a crank assembly 14 which is operatively connected with a slide 15 for effecting reciprocation thereof in a recess 15' (Fig. 14) in the lateral projection 17 of the frame 1, this assembly being preferably adapted for adjustment, whereby the stroke and dwell of the slide may be varied. The slide 15 is provided with a cam slot 16 for effecting transverse reciprocal movements of a cut-off knife 39 and fiddle bow, which will be hereinafter more fully described, by means of a roller 17' riding in said cam slot. The cut-off knife and fiddle bow are connected with the roller 17' by means of the L-shaped member 18.

Actuated by the toggle mechanism 4 is the conventional punch block or header die assembly 19 carried by the vertically movable slide 20', in which the preliminary coning and finishing punches or dies are mounted, these punches being designated 20 and 21, respectively.

Reference will now be made to the novel combined heading and thread rolling die assembly which has been found to be particularly well adapted for the purpose of making screws in accordance with the method of this invention. The assembly is generally denoted at 22 and is best shown in Figures 4 through 8. This assembly 22 provides a cut-off station 23, and a combined head forming and thread rolling station 24, and includes a block 26 at the latter station, this block being vertically extended and received in a vertical recess 27 in the frame 1 of the apparatus.

Figures 4, 14:
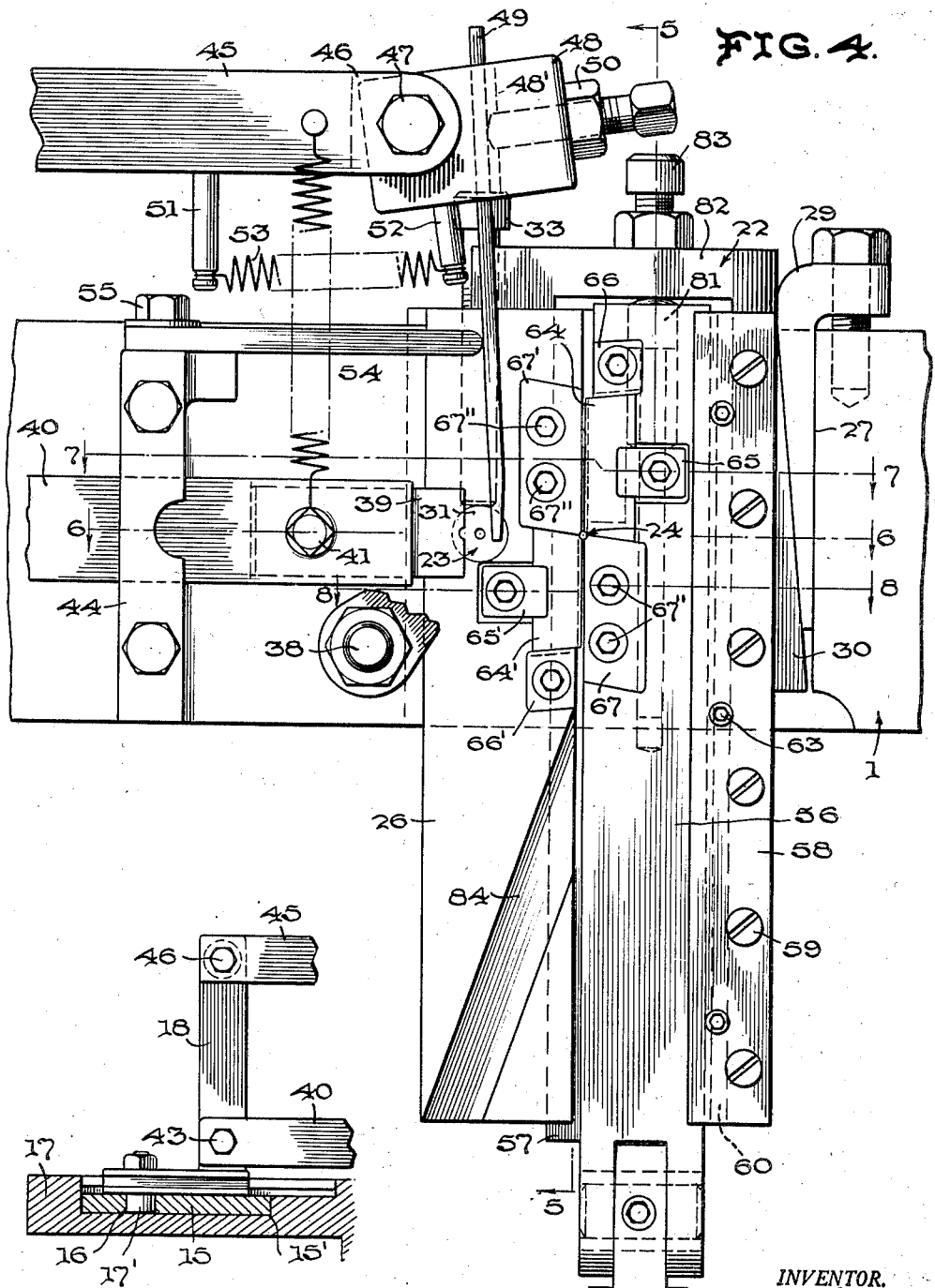
Figure 4 is an enlarged fragmentary view in rear elevation, as taken on the line 4—4 of Figure 1, showing the cut-off, transfer and thread forming mechanisms.
Figure 14 is an enlarged fragmentary view in vertical section of the power transmitting mechanism for the fiddle bow and cut-off knife, as taken on the line 14—14 of Figure 1.
Figure 6:
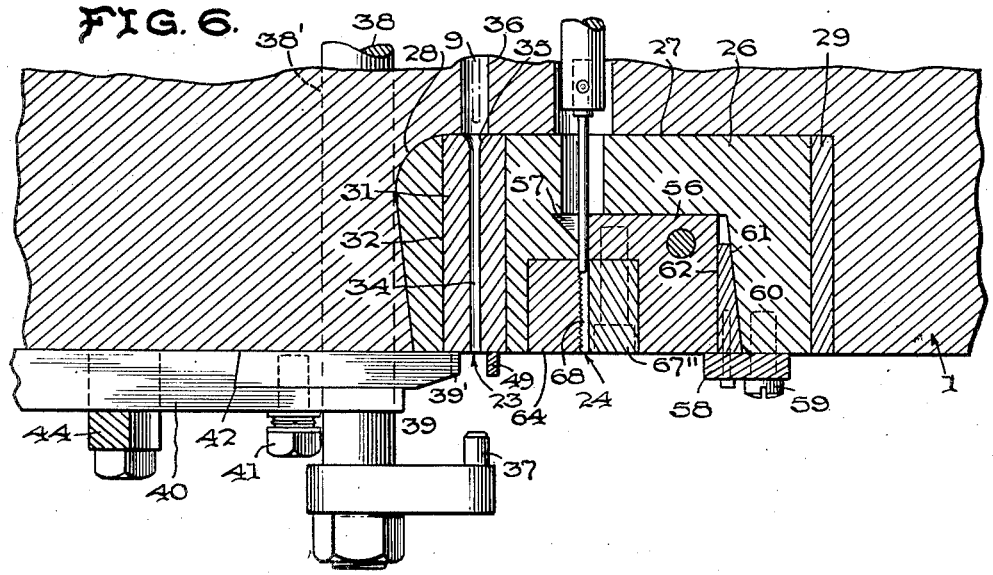
Figure 6 is a view in horizontal section, as taken on the line 6—6 of Figure 4; with certain of the parts shown in plan.
Figure 7:
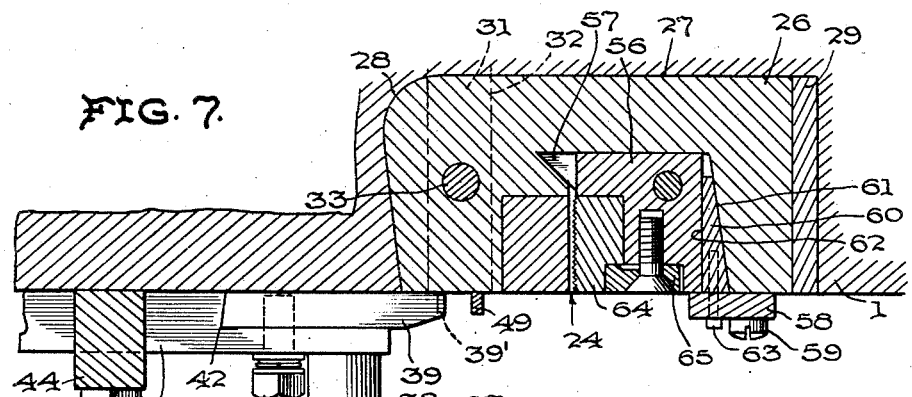
Figure 7 is a view in horizontal section, as taken on the line 7—7 of Figure 4.
Figure 8:
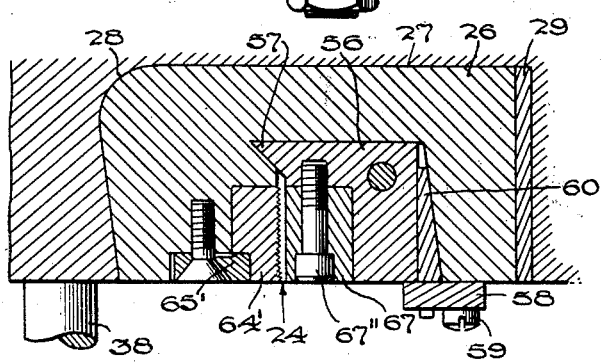
Figure 8 is a view in horizontal section, as taken on the line 8—8 of Figure 4.

As is best seen in Figures 6 to 8, the vertical recess 27 is slightly undercut on one of its sides, as seen at 28, and the block 26 is formed to project into and closely fit this undercut side of the recess. The block 26 is of a lesser width than the recess 27 and is displaceably secured therein by means of a vertically extended wedge 29 cooperative with a complementary laterally extended wedge projection 30 on the block 26 in an apparent manner, as best seen in Figure 4.

To accomplish the wire stock cut-off step of this invention, the block 26 is provided with a quill 31 which is secured against displacement in a bore 32 in which it is located, by means of a set screw 33. The quill 31 has an axial opening 34 therethrough terminating at one end in a bell mouth 35, the opening 34 being in alignment with an opening 36 in the frame 1. The wire stock 9 is intermittently fed from the feeding station 10 through the openings 36 and 34 until it abuts against the adjustable stop 37 which is carried by a rod 38, the rod 38 being adjustably mounted in a hole 38' in the frame 1, whereby the lengths of wire stock to be cut off may be varied to permit forming of screws of different lengths.

The cut-off knife 39 is mounted for movement across the end of the quill 31 (which end is flat in the case where blunt end screws are to be made) for cutting off the section of wire stock extending between the end of the quill and the stop 37. The cut-off knife 39 is carried at the free end of a bar 40 and is connected thereto by means of the bolt 41, relative movement between the knife 39 and the bar 40 being prevented by the undercut joint denoted at 42. The opposite end of the bar 40 is connected to the member 19 of the operating mechanism, as best seen in Figure 14 at 43. Intermediate its ends, the bar 40 is slidably supported on the frame 1 by means of the guide block 44 which is suitably secured to the frame 1. Thus, it is readily apparent that operation of the slide 15 effects timed reciprocation of the cut-off knife 39 across the face of the quill 31, thereby cutting off screw blank sections from the wire stock 9.

The apparatus which effects the screw blank transfer step of the present invention, comprises a fiddle bow 45 connected at one of its ends, as at 46, to the motion transmitting member 18, the free end of the fiddle bow 45 terminating in a yoke 46. Pivotally mounted in the yoke 46, by means of the bolt 47, is a transfer finger-carrying-block 48, this block 48 having an opening 48' therethrough at a slight angle relative to the vertical for receiving the transfer finger 49 which is adapted for vertical adjustment in the opening 48' by means of the set screw and jamb nut assembly 50. A pair of studs 51 and 52 are carried at the lower side of the fiddle bow 45 and block 48, respectively, and a tension spring 53 interconnects the studs 51 and 52 so as to bias the transfer finger 49 to the left, as seen in Figure 4, or towards the cut-off knife, about the pivot bolt 47, into abutting contact with the stop member 54 which is mounted on the guide block 44, as at 55. The operation of this transfer mechanism will be hereinafter more fully described.

Passing now to the heading and thread rolling station 24 of this invention, there is located at this station a second vertically reciprocable slide block 56 which is slidably carried in the stationary block 26 and is restrained from displacement relative thereto by the off-set rib 57 on the block 56, slidingly engaging behind the corresponding under-cut of the block 26, and behind the vertical retainer plate 58 which is secured to the outside face of the block 26 by means of a series of bolts as at 59. The vertically slidable block 56 is also held against transverse play and axial misalignment by means of an adjustable wedge or bearing 60 mounted between the inclined wall 61 of the block 26 and the wall 62 of the block 56, as best seen in Figures 6 to 8. This wedge shaped bearing is adjustably positioned by means of the screws 63 in an obvious manner.

Carried by the slide block 56 as at 64 and by the stationary block as at 64' are, respectively, a reciprocable threading die and a stationary threading die, the reciprocable die 64 being adapted for movement lengthwise of and across the fixed die 64' with the adjacent faces of the dies spaced to properly accommodate a screw blank therebetween that is to be threaded, as in conventional thread rolling machines. For further details of the thread rolling operation, reference may be had to Patent No. 2,165,007. These thread rolling dies 64 and 64' are removably clamped in corresponding recesses in the slide block 56 and the stationary block 26 by means of screw clamps 65 and 65' and screw fastened wedges 66 and 66'.

Figure 9:
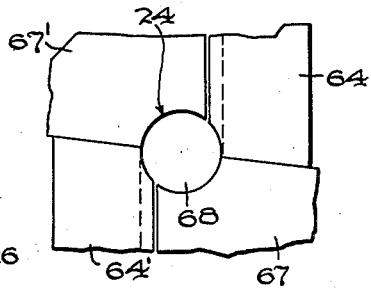
Figure 9 is an enlarged fragmentary detail view of the thread rolling dies which also serve to hold the screw blanks during the heading operations.
Figure 5:
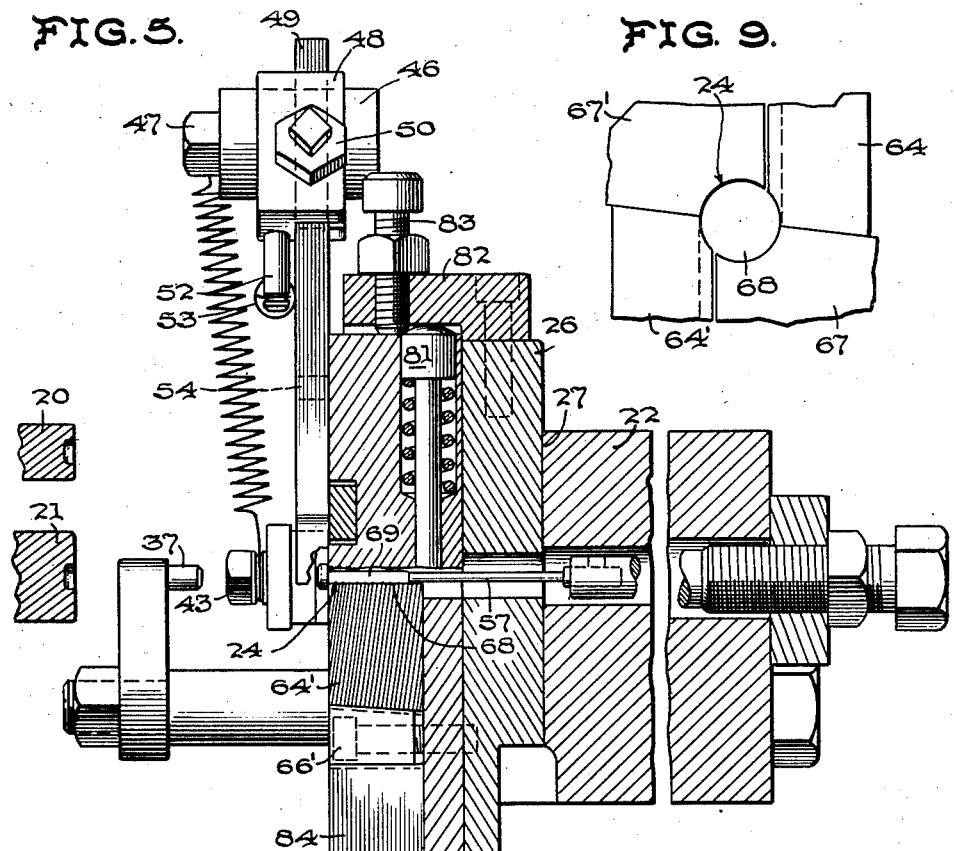
Figure 5 is a view in vertical section, as taken on the plane of the line 5—5 of Figure 4, showing a headed screw blank positioned in the rolling dies preparatory to the rolling of threads thereon.

The thread rolling dies 64—64' act additionally as heading die segments during the heading operation, and a second pair of heading die segments or blocks 67—67', disposed adjacent the threading dies, complete a cavity 68 into which the screw blank 69 (see Figure 5) is driven by the coning punch 20 when each severed screw blank is transferred into register with the cavity 68 by means of the transfer mechanism previously described. The heading die segment 67 is mounted in a recess in the slide block 56 by means of a pair of bolts 67'', and the segment 67' is likewise mounted in the stationary block 26. The cavity 68 is formed by the arcuate recesses in each of the adjacent corners of the threading dies 64—64' and the heading die segments 67—67', as best seen in Figure 9.

Intermittent reciprocation of the slide block 56 and consequent rolling of threads on the screw blanks 69 which are successively positioned therein is preferably effected by means of a transmission unit 70 which is driven by means of a chain or the like 71 operatively interconnecting the shaft 2 and the transmission drive sprocket 72 which is keyed on the input shaft 73. Rotation is thus transmitted through the segment gear 74, thence to the gear 75, which completes ½ a revolution upon approximately a ¼ revolution of the gear 74 and dwells for the remaining ¾ revolution of said gear 74. A second gear 75' is mounted on the shaft 76 with gear 75 and is in driving contact with a 2 to 1 reduction gear 77 keyed to shaft 78. Thus, it is apparent that each complete revolution of the crankshaft 2 will cause a complete revolution of the shaft 78, the full revolution of shaft 78 occurring during the ¼ of a revolution of shaft 73 and crankshaft 2. Other mechanisms may be employed, if desired, to obtain the intermittent motion above referred to, in lieu of the intermittent gear transmission disclosed herein.

Keyed to shaft 78 is a crank arm 79 which is adjustably interconnected with the bottom end of the vertically reciprocable slide block 56 by means of a longitudinally adjustable pitman 80. The length of the pitman 80 determines the extent of upward movement of the block 56, and therefore, the size of the cavity 68 at the heading station 24 may be slightly varied to accommodate screw blanks of slightly different diameters. The block 56 is provided with a spring loaded bumper 81 to cushion the blow of the slide block 56 against a cap plate 82 when the block 56 reaches its uppermost limit of travel (see Figures 4 and 5). The cap plate 82 is also provided with an adjustable stop screw 83 which is adapted to make fine adjustments to the size of the cavity 68, such as adjustments on the order of approximately .001'' or less. The stop screw 83 acts to force the crank arm 79 slightly off center due to the inherent slight back-lash in the intermittent gear mechanism of the transmission 70.

The formation of screw threaded fasteners by the novel apparatus hereinbefore described will now be summarized.

A continuous length of wire stock of appropriate size for the screw desired is supported on a reel (not shown) and is intermittently fed by the feeding mechanism 10 through the quill 31 until it abuts against the adjustable stop 37 at the cut-off station 23. Then, in timed sequence, the cut-off knife 39 and the fiddle bow 45 are moved in unison to the right, as viewed in Figure 4, the free end of the knife being provided with an arcuate recess 39' to engage the wire stock and cut off a screw blank. Movement of the fiddle bow 45 to the right in Figure 4 shifts the block 40 likewise to the right and permits the block to swing downwardly until the lower portion of the transfer finger 49 engages the cut off blank and firmly holds the blank in the recess 39' of the cut-off knife 39. Continued movement of the cut-off knife 39 along with the transfer finger 49 carries the screw blank to the heading station 24, until it is registered with the cavity 68 defined by the segments of the thread rolling dies 64—64' and the coacting segments 67—67'. The machine is so synchronized that the preliminary or coning punch 20 now strikes the screw blank, driving it into the cavity 68 and up against the stop pin 57, and partially forming a head on the blank, as seen at 69 in Figure 5. The coning punch 20 then moves back and the head finishing punch 21 is automatically shifted into position for movement against the head of the blank 69, thereby completing the heading operation while the blank is held between the thread rolling dies. If desired, the heading punches may include means for striking a slot, socket or other recess in the head of the blank during the heading operation.

Figures 10, 11, 12:
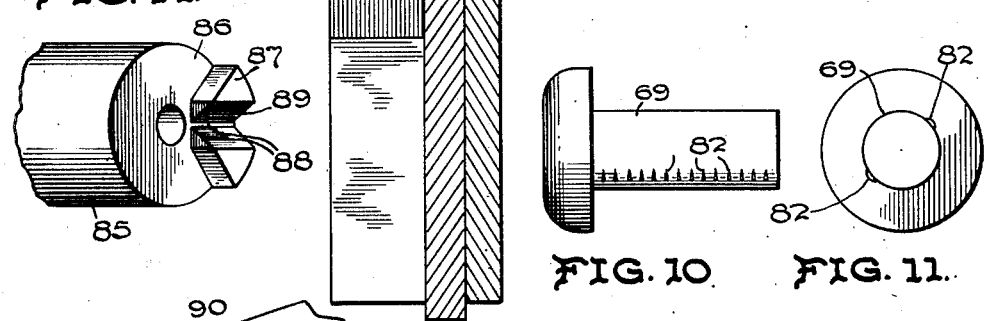
Figure 10 is an enlarged view in side elevation of one of the headed screw blanks formed by the apparatus of this invention, as it is just prior to the final steps of rolling the threads thereon.
Figure 11 is a view in end elevation of the screw blank of Figure 10.
Figure 12 is an enlarged fragmentary view in perspective of a modified form of guide quill, adapted for cutting off screw blanks with a pyramidal point, for use in making pointed screws.

Responsive to the force of the punches 20 and 21, a portion of the metal of the screw blank shank is forced into the grooves between the threading ribs on the faces of the threading dies 64—64', thereby forming a line of projections 82 on diametrically opposite sides of the screw blank 69, as best seen in Figures 10 and 11. These projections 82 are small segments of the thread which is to be rolled on the shank and act to positively and accurately locate the blank between the thread rolling dies 64—64' preparatory to the thread rolling step.

The machine is so timed that during the foregoing operation, the intermittent transmission 70 has been in its dwell period during the cut-off and blank heading operations, but thereafter the segmental gear 74 now engages gear 75, as seen in Figure 23, and the shaft 78 is caused to complete one cycle or revolution, as has been hereinbefore described. Accordingly, during this cycle, the pitman 80 pulls the slide block 56 down, thereby rolling the threads on the shank of the screw blank 69 between the thread rolling dies. As the blank 69 passes the lower end of the die 64', it falls into the chute 84, and thence into a suitable receiver or handling receptacle (not shown). During this thread rolling operation, the cut-off knife 39 and transfer finger 49 have moved back into their original positions, and another section of the wire stock has been fed in, cut off, and transferred to the heading station, and is ready to be driven, by the coning punch 20, into cavity 68.

The above described method and apparatus forms a screw having a substantially flat or blunt leading end, but pointed screws may be made equally as well by merely a slight modification of some of the parts, as will now be described.

Figure 12 shows a modified quill 85 adapted for cutting screw blanks with a pointed leading end. This quill is the same as the quill 31 except that its rear end face 86 is provided with a projection 87 on the side nearest the heading station, the projection having a pair of angularly disposed cutting edges 88 and a corresponding V-shaped recess or groove 89 extending therethrough radially of the quill 85.

Figure 13:
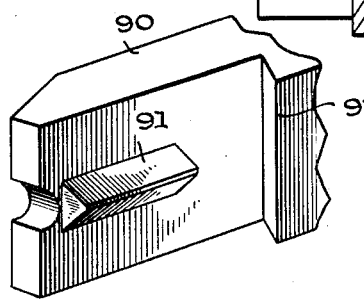
Figure 13 is an enlarged fragmentary view in perspective of a modified form of cut-off knife adapted for cooperation with the quill of Figure 12.

The cut-off knife 90, shown in Figure 13, is adapted to cooperate with the cutting edges 88 of the modified quill 85 by the provision of a V-shaped projection 91 which is complementary to the V-shaped recess 89 in the quill 85. The knife 90 is further provided with a cutting edge 92 for a purpose which will hereinafter become apparent.

The operation of the modified form of the quill 85 and the knife 90 will now be described with reference to Figures 15 through 21, it being understood that the machine operates in the same manner as hereinbefore described.

As shown in Figure 15, the wire stock 9 has been fed up to the stop 37, and the cut-off knife 90 is moving to the right into engagement with the screw blank section 69. Further movement of the knife 90 bends the end 69 of the wire stock over, as in Figure 16, forming a flat face 93 on the left side of the blank 69, and continued movement of the knife straightens the wire again, as in Figure 17. Still further movement of the knife 90 causes the V-shaped projection 91 thereon to push the blank past the cutting edges 88 on the projection 87 of the quill, and at the same time flattening the righthand face of the blank by the natural material flow induced by forcing the blank against a cutting edge of the quill, thereby completing a point on the end of the blank 69, and the transfer finger 49 has started to swing down into blank-engaging position.

Cutting of the pointed blank 69 has left a pair of small waste bits 94 on the end of the wire stock 9 (see Figure 18a), which must be removed to produce a clean end on the wire for the next succeeding blank to be cut off.

As seen in Figure 19, the transfer finger has now engaged the severed blank 69 which is now being transferred to the heading station, and the cutting edge 92 of the knife 90 is ready to cut off the waste bits 94. Further movement of the knife, as in Figure 20, severs the bits 94 and compresses them against the projection 87, thereby spreading a portion of these bits into the V-shaped recess or groove 89.

In Figure 21, the blank 69 has been punched into the cavity 68, and the cut-off knife 90 and the transfer finger 49 are on their return stroke. During this return stroke the rear edge of the V-shaped projection 91 will eject the cut off bits of waste from the V-groove 89, causing said bits to drop from the quill.

The pointed end of the blank that is formed at the above described cut-off station is substantially pyramidal in form, but the point is further shaped by the rolling die 64'' and the heading die segment 67'' into a round, tapering point. The thread rolling die 64'' and the heading die segment are slightly modified for purposes of threading a pointed screw, as seen in Figure 21, by being inclined toward each other on their inner faces, as at 95, to form and thread the desired point. In forming pointed screws as above, the stop member 57 is not used.

Interrupted threads and other shapes and types of screws may be produced according to the invention hereinbefore described by appropriately changing the machine tools, such as the dies.

While the specific details have been herein shown and described, my invention is not confined thereto as changes and alterations may be made without departing from the spirit thereof as defined by the appended claims.

I claim:

1. Apparatus for making screw fasteners, comprising means for feeding a continuous length of wire stock to a cut-off station, means at said cut-off station for successively cutting off predetermined lengths of the wire stock to form screw blanks, means for transferring the cut off screw blanks from the cut-off station to a second station, a plurality of relatively shiftable die segments at said second station, said die segments defining a screw blank-receiving cavity, means at said second station for driving the screw blank into said cavity for forming a head on the screw blank, at least two of said die segments having opposed longitudinally extended screw blank-engaging faces provided with thread-rolling ribs and grooves, and means operative in timed relation to the screw blank driving means aforesaid for relatively shifting said last-mentioned die segments to form threads on the screw blank after the screw blank has been headed.

2. Apparatus for making screw fasteners as defined in claim 1, wherein the means at the cut-off station for successively cutting off predetermined lengths of wire stock, includes a quill having a projection on its cut-off end disposed at one side of the central axis of said quill, said projection being provided with a V-shaped groove, and a cut-off knife having a V-shaped rib cooperative with the V-shaped groove aforesaid for successively cutting off pointed screw blanks from the wire stock, said die segments each being formed with an arcuate depression having a tapered end, and the depressions together forming a pointed screw blank-receiving cavity.

3. Apparatus for making screw fasteners, comprising means for feeding a continuous length of wire stock to a cut-off station, means at said cut-off station for successively cutting off predetermined lengths of the wire stock to form screw blanks, means for transferring the cut off screw blanks from the cut-off station to a second station, means at said second station for forming a head on the screw blank, and means also at the second station for forming threads on the screw blank, said means at the cut-off station for successively cutting off predetermined lengths of wire stock including a quill and a cut-off knife, said quill and cut-off knife respectively having a V-shaped groove and a corresponding V-shaped rib cooperative with each other for successively cutting off point screw blanks and leaving waste bits remaining on each succeeding section of wire stock to be cut off, and means also on the cut-off knife aforesaid for cutting off and ejecting said waste bits.

4. Apparatus for making screw fasteners, comprising means for feeding a continuous length of wire stock to a cut-off station, means at said cut-off station for successively cutting off predetermined lengths of the wire stock to form screw blanks, means for transferring the cut off screw blanks from the cut-off station to a second station, means at said second station for forming a head on the screw blank, and means also at the second station for forming threads on the screw blank, said second station including a combined heading and thread-rolling die assembly, and a two-blow, toggle operated heading punch mechanism cooperative with the die assembly aforesaid.

5. Apparatus for making screw fasteners, comprising means for feeding a continuous length of wire stock to a cut-off station, means at said cut-off station for successively cutting off predetermined lengths of the wire stock to form screw blanks, means for transferring the cut off screw blanks from the cut-off station to a second station, means at said second station for forming a head on the screw blank, and means also at the second station for forming threads on the screw blank, said second station including a stationary thread-rolling die and a reciprocable thread-rolling die cooperative with said stationary die for forming threads on each successive screw blank, a two-blow, toggle-operated heading mechanism, and means for holding each successive screw blank during the operation of said heading means.

6. Apparatus for making screw fasteners, comprising means for feeding a continuous length of wire stock to a cut-off station, means at said cut-off station for successively cutting off predetermined lengths of the wire stock to form screw blanks, means for transferring the cut off screw blanks from the cut-off station to a second station, means at said second station for forming a head on the screw blank, and means also at the second station for forming threads on the screw blank, said second station including a stationary thread-rolling die and a reciprocable thread-rolling die cooperative with said stationary die for forming threads on each successive screw blank, and also including a stationary heading die segment and a reciprocable heading die segment, the thread-rolling dies and heading die segments aforesaid cooperating with each other to provide means for holding each successive screw blank therebetween during the heading operation and in starting position in the thread-rolling dies for the thread-rolling operation.

7. Apparatus for making screw fasteners, comprising means for feeding a continuous length of wire stock to a cut-off station, means at said cut-off station for successively cutting off predetermined lengths of the wire stock to form screw blanks, means for transferring the cut off screw blanks from the cut-off station to a second station, means at said second station for forming a head on the screw blank, and means also at the second station for forming threads on the screw blank, said means for forming screw threads on the screw blank including relatively reciprocable thread-rolling dies operable in timed relation to the cut-off means at the cut-off station, said thread-rolling dies defining a screw blank receiving cavity in one position, into which cavity the screw blank is transferred from the cut-off station and held stationary during the heading operation at the second station preliminary to the thread-rolling operation performed by the thread-rolling dies.

8. Apparatus for making screw fasteners, comprising means for feeding a continuous length of wire stock to a cut-off station, means at said cut-off station for successively cutting off predetermined lengths of the wire stock to form screw blanks, means for transferring the cut off screw blanks from the cut-off station to a second station, means at said second station for forming a head on the screw blank, and means also at the second station for forming threads on the screw blank, said means for forming screw threads on the screw blank including relatively reciprocable thread-rolling dies operable in timed relation to the cut-off means at the cut-off station, said thread-rolling dies defining a screw blank receiving cavity in one position, into which cavity the screw blank is transferred from the cut-off station and held stationary during the heading operation at the second station preliminary to the thread-rolling operation performed by the thread-rolling dies, and said heading means at the second station including a two-blow, toggle-operated header mechanism operable in timed relation to the cut-off means and to the thread-rolling dies.

9. Apparatus for making screw fasteners, comprising means for feeding a continuous length of wire stock to a cut-off station, means at said cut-off station for successively cutting off predetermined lengths of the wire stock to form screw blanks, means for transferring the cut off screw blanks from the cut-off station to a second station, a combined heading and thread-rolling die assembly at said second station, said die assembly including a pair of relatively shiftable thread-rolling dies having opposed longitudinally extended screw blank-engaging faces provided with thread-rolling ribs and grooves, and a reciprocable heading punch mechanism also at said second station and cooperative with the die assembly aforesaid to form a head on said screw blank.

10. Apparatus for making screw fasteners as defined in claim 9, wherein said die assembly includes a pair of relatively shiftable supports, a thread-rolling die carried by one of said supports and a complemental thread-rolling die carried by the other support, a heading die carried by one of said supports and a complemental heading die carried by the other support, each of said dies having an arcuate depression therein, said depressions defining a cavity between said dies when the supports are in one position relative to each other, said heading punch mechanism having means for shifting the punch toward said die assembly when the supports are in said one position to drive the screw blank into said cavity and head the same, and said die assembly also including means operative in timed relation to said punch mechanism for relatively shifting said supports to roll threads on the headed screw blank.

LOUIS J. LOVISEK.

References Cited in the file of this patent

UNITED STATES PATENTS

| Number | Name | Date |
|---|---|---|
| 464,466 | Rogers | Dec. 1, 1891 |
| 693,342 | Warwick | Feb. 11, 1902 |
| 842,282 | Warwick | Jan. 29, 1907 |
| 967,327 | Clark | Aug. 16, 1910 |
| 986,697 | Deeds | Mar. 14, 1911 |
| 996,840 | Deeds | July 4, 1911 |
| 1,299,115 | Brennan | Apr. 1, 1919 |
| 1,909,147 | Flynn | May 16, 1933 |
| 1,946,243 | Simkins et al. | Feb. 6, 1934 |
| 2,239,352 | Cherry | Apr. 22, 1941 |
| 2,314,390 | DeVellier | Mar. 23, 1943 |